US009227870B2

(12) United States Patent
Nonaka et al.

(10) Patent No.: US 9,227,870 B2
(45) **Date of Patent: *Jan. 5, 2016**

(54) GLASS FIBER

(71) Applicant: NITTO BOSEKI CO., LTD., Fukushima (JP)

(72) Inventors: Takashi Nonaka, Fukushima (JP); Hiroshi Kanno, Fukushima (JP); Takamichi Inaba, Fukushima (JP)

(73) Assignee: NITTO BOSEKI CO., LTD., Fukushima (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/466,310

(22) Filed: Aug. 22, 2014

(65) Prior Publication Data

US 2015/0011374 A1 Jan. 8, 2015

Related U.S. Application Data

(63) Continuation of application No. 13/702,770, filed as application No. PCT/JP2011/062397 on May 30, 2011, now Pat. No. 8,841,222.

(30) Foreign Application Priority Data

Jun. 8, 2010 (JP) ................................ 2010-131185

(51) Int. Cl.
*C03C 13/00* (2006.01)
*C03C 13/06* (2006.01)
*C03C 3/087* (2006.01)
*C03C 10/00* (2006.01)

(52) U.S. Cl.
CPC ............... *C03C 13/006* (2013.01); *C03C 3/087* (2013.01); *C03C 10/0045* (2013.01); *C03C 13/00* (2013.01); *C03C 13/06* (2013.01); *C03C 2213/00* (2013.01)

(58) Field of Classification Search
CPC ...... C03C 13/06; C03C 13/006; C03C 3/087; C03C 13/00
See application file for complete search history.

(56) References Cited

U.S. PATENT DOCUMENTS

| | | | | |
|---|---|---|---|---|
| 3,819,387 | A | 6/1974 | Leger et al. | |
| 5,789,329 | A | 8/1998 | Eastes et al. | |
| 5,962,354 | A | 10/1999 | Fyles et al. | |
| 8,841,222 | B2 * | 9/2014 | Nonaka et al. | 501/35 |
| 2007/0105701 | A1 | 5/2007 | Hoffmann et al. | |
| 2008/0009403 | A1 | 1/2008 | Hofmann et al. | |
| 2012/0129678 | A1 | 5/2012 | Tang | |
| 2012/0163987 | A1 | 6/2012 | Hausrath et al. | |

FOREIGN PATENT DOCUMENTS

| | | | |
|---|---|---|---|
| CN | 101300199 | A | 11/2008 |
| CN | 101580344 | A | 11/2009 |
| CN | 101597140 | A | 12/2009 |
| CN | 101691278 | A | 4/2010 |
| EP | 2354104 | A1 | 8/2011 |
| JP | 62-001337 | A2 | 1/1987 |
| JP | 2002-220256 | A | 8/2002 |
| JP | 2009-514772 | A | 4/2009 |
| JP | 2009-514773 | A | 4/2009 |
| KR | 100391963 | B1 | 11/2003 |
| KR | 10-0544804 | B1 | 1/2006 |
| KR | 10-2008-0064144 | A | 7/2008 |
| RU | 2245477 | C1 | 1/2005 |
| TW | 200728226 | A | 8/2007 |
| TW | 200902462 | A | 1/2009 |
| WO | 2007/055968 | A2 | 5/2007 |
| WO | 2011/017405 | A1 | 2/2011 |
| WO | 2011/095597 | A1 | 8/2011 |
| WO | 2011/095601 | A1 | 8/2011 |
| WO | 2011/131761 | A1 | 10/2011 |

OTHER PUBLICATIONS

International Search Report issued in corresponding International Application No. PCT/JP2011/062397 dated Aug. 23, 2011.

International Preliminary Report on Patentability and Written Opinion issued in corresponding International Patent Application No. PCT/JP2011/062397 dated Jan. 15, 2013.

Office Action issued in counterpart Korean Patent Application No. 10-2012-7034382 dated Jul. 10, 2013.

Notice of Allowance issued in counterpart Taiwanese Patent Application No. 100119822 dated Aug. 22, 2013.

* cited by examiner

*Primary Examiner* — Anthony J Green
*Assistant Examiner* — Elizabeth A Bolden
(74) *Attorney, Agent, or Firm* — Morgan, Lewis & Bockius LLP

(57) ABSTRACT

There is provided a glass fiber comprising the $SiO_2$ content is 57.0 to 63.0% by weight; the $Al_2O_3$ content is 19.0 to 23.0% by weight; the MgO content is 10.0 to 15.0% by weight; the CaO content is 4.0 to 11.0% by weight; and the total content of $SiO_2$, $Al_2O_3$, MgO and CaO is 99.5% by weight or higher based on the total weight.

11 Claims, 2 Drawing Sheets

GLASS FIBER

TECHNICAL FIELD

The present invention relates to a glass fiber, particularly a high-elasticity glass fiber.

BACKGROUND ART

As a glass for a glass fiber excellent in strength and elastic modulus, a glass (S glass) composed of a glass composition of $SiO_2$, $Al_2O_3$ and MgO is conventionally known. However, with respect to the S glass, the production of the glass fiber is not always easy from the viewpoint of the 1,000-poise temperature and the liquid phase temperature. Here, the 1,000-poise temperature refers to a temperature at which the melt viscosity of a glass becomes 1,000 poises, and the liquid phase temperature refers to a temperature at which the crystal deposition takes place for the first time when the temperature of a molten glass is decreased. Generally since glass fibers can efficiently be produced in the case where glass is spun by making the melt viscosity of the glass nearly 1,000 poises, spinning is usually carried out in the temperature range (working temperature range) between the 1,000-poise temperature and the liquid phase temperature. With respect to the S glass, the working temperature range is narrow, and the molten glass is liable to crystallize (devitrify) even under an influence of only a slight temperature decrease. Therefore, in order to carry out stable spinning, in the production step of glass fibers, the spinning condition needs to be precisely controlled.

As an improved S glass, glass compositions containing $SiO_2$, $Al_2O_3$, MgO and CaO are known (Patent Literature 1 and Patent Literature 2 shown below). Patent Literature 1 discloses a glass composition easily fiberized along with a decrease in the liquid phase temperature. Patent Literature 2 discloses a glass composition in which a difference is large between a temperature (fiberization temperature) corresponding to the viscosity of a near 1,000-poise temperature and a maximum temperature (liquidus) at which an equilibrium is present between a liquid glass and a primary crystal phase thereof.

CITATION LIST

Patent Literature

Patent Literature 1: Japanese Examined Patent Application Publication No. 62-001337

Patent Literature 2: Japanese Unexamined Patent Application Publication No. 2009-514773

SUMMARY OF INVENTION

Technical Problem

However, studies by the present inventors have revealed that although glass compositions of Patent Literatures shown above had a somewhat broad working temperature range, there are some cases where the 1,000-poise temperature and the liquid phase temperature are high, and the production of glass fibers is not always easy. There has been revealed also a tendency that the elastic modulus of glass fibers obtained was insufficient.

Then, the present invention has been achieved in consideration of such problems of conventional technologies, and has an object to provide a glass fiber which is easily produced and has a sufficient elastic modulus.

Solution to Problem

In order to achieve the above-mentioned object, the glass fiber according to the present invention has a composition in which, the $SiO_2$ content is 57.0 to 63.0% by weight; the $Al_2O_3$ content is 19.0 to 23.0% by weight; the MgO content is 10.0 to 15.0% by weight; the CaO content is 4.0 to 11.0% by weight; and the total content of $SiO_2$, $Al_2O_3$, MgO and CaO is 99.5% by weight or higher based on the total weight. Since having such a composition can reduce the 1,000-poise temperature and the liquid phase temperature, the production of the glass fiber from the glass composition is easy. Additionally, the glass fiber results in having a sufficient elastic modulus.

In the composition of the above glass fiber, the total content of the contents of $SiO_2$ and $Al_2O_3$ is preferably 77.0 to 85.0% by weight. If the total content is 85.0% by weight or lower, since the 1,000-poise temperature and the liquid phase temperature can be reduced, the production of the glass fiber from the glass composition is easy. By contrast, if the total content is 77.0% by weight or higher, since the devitrification phenomenon of deposition of crystals in the glass hardly occurs, spinning becomes easy in the production.

Further in the composition of the above glass fiber, the weight ratio of the $SiO_2$ content/the $Al_2O_3$ content is preferably 2.7 to 3.2. If the ratio is in such a range, the glass fiber results in having a broad working temperature range in the production, and having a sufficient elastic modulus.

Further in the composition of the above glass fiber, the total content of the MgO content and the CaO content is preferably 16.0% by weight or higher. In this case, since the 1,000-poise temperature and the liquid phase temperature of the glass composition, which is a raw material of the glass fiber, are low and additionally the viscosity of the molten glass decreases, and thereby the glass composition easily melts, the production of the glass fiber from the glass composition becomes easier.

Further in the composition of the above glass fiber, the weight ratio of the MgO content/the CaO content is preferably 0.8 to 2.0. If the weight ratio is 2.0 or lower, since the liquid phase temperature decreases, the working temperature range in the production can be broadened. By contrast, if the weight ratio is 0.8 or higher, the glass fiber results in having a sufficient elastic modulus.

The present invention also provides a glass fiber having a composition in which the three components $SiO_2$, MgO and CaO out of constituents of the glass fiber satisfy the condition being in the range surrounded by coordinate points described below in a three-component phase diagram represented by coordinates ((a), (b), (c)) in which (a) the $SiO_2$ content/(the $SiO_2$ content+the MgO content+the CaO content)×100, (b) the MgO content/(the $SiO_2$ content+the MgO content+the CaO content)×100, and (c) the CaO content/(the $SiO_2$ content+the MgO content+the CaO content)×100 are taken as respective coordinates, the coordinate points being ((a)=81.0, (b)=19.0, (c)=0.0), ((a)=71.0, (b)=29.0, (c)=0.0), ((a)=71.0, (b)=15.0, (c)=14.0) and ((a)=81.0, (b)=8.0, (c)=11.0).

The present inventors have found that by making a crystal (devitrification primary phase) formed first in devitrification of the glass to form a cordierite crystal or a mixed crystal of cordierite and anorthite, the devitrification speed can be suppressed. Particularly in the case where $Al_2O_3$ is made nearly 20% by weight, by making the above condition of the three-component phase diagram to be satisfied, the devitrification primary phase becomes a cordierite crystal or a mixed crystal of cordierite and anorthite. Therefore, a glass fiber having such a composition, even in the case where the working temperature range in the production cannot sufficiently be broadened, becomes easy to produce without causing devitrification, and furthermore results in having a sufficient elastic modulus.

Advantageous Effects of Invention

The present invention can provide a glass fiber which is easily produced and has a sufficient elastic modulus by having a specific composition.

DESCRIPTION OF EMBODIMENTS

Figure 1:
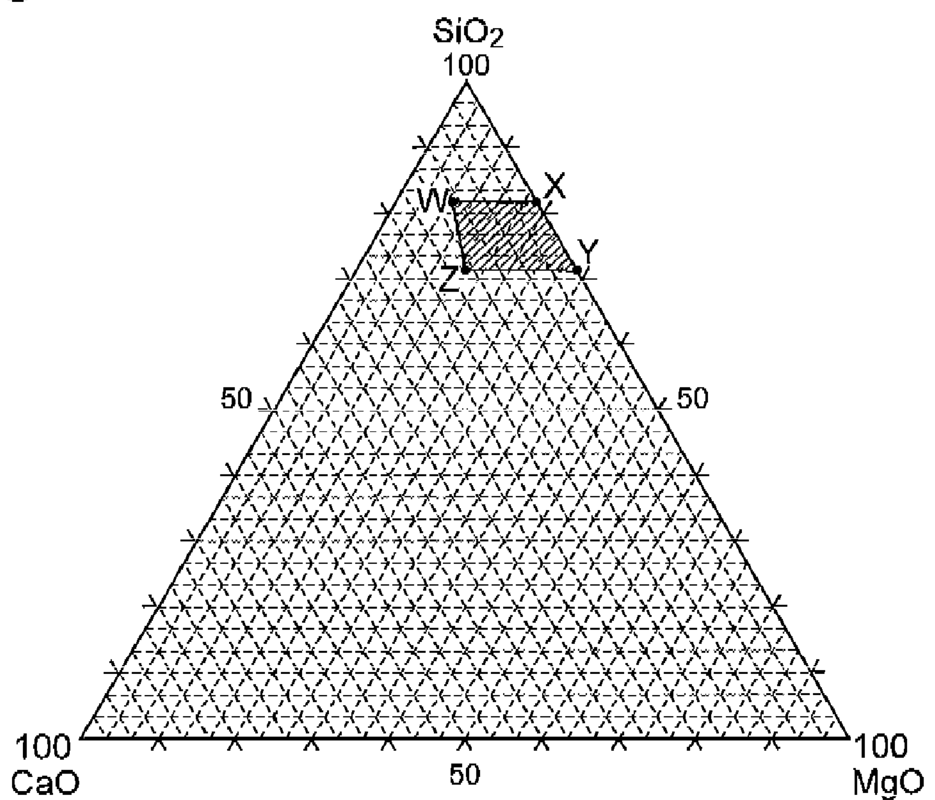
FIG. 1 is a composition diagram showing three-component compositions of $SiO_2$, MgO and CaO of glass fibers.

The composition of the glass fiber according to the present embodiment is a basic composition containing $SiO_2$, $Al_2O_3$, MgO and CaO, and the content of each component is in the following range. The content is based on the total weight of the composition of the glass fiber.

(1) $SiO_2$: 57.0 to 63.0% by weight
(2) $Al_2O_3$: 19.0 to 23.0% by weight
(3) MgO: 10.0 to 15.0% by weight
(4) CaO: 4.0 to 11.0% by weight
(5) The total of the above (1) to (4): 99.5% by weight or higher The glass fiber according to the present embodiment, since having the above composition, can have a sufficiently broadened working temperature range in the production from the glass composition, and can become one having an elastic modulus equal to that of S glass. Specifically, while the 1,000-poise temperature can be made 1,385° C. or lower (typically 1,350° C. or lower), and the working temperature range is secured sufficiently (typically 40° C. or higher), the glass fiber having as high an elastic modulus as of about 95 GPa or higher (typically 97 to 98 GPa) can efficiently be provided.

If the $SiO_2$ content is 57.0% by weight or higher based on the total weight of the composition of the glass fiber, the mechanical strength as the glass fiber can be improved, and the glass fiber is chemically stable. On the other hand, if the content is 63.0% by weight or lower, since the 1,000-poise temperature and the liquid phase temperature decrease, the production of the glass fiber is easy. Particularly in order to make the 1,000-poise temperature 1,350° C. or lower, the $SiO_2$ content is preferably 57.5 to 62.0% by weight, and more preferably 58.0 to 61.0% by weight, based on the total weight of the composition of the glass fiber.

The case where the $Al_2O_3$ content is 19.0% by weight or higher based on the total weight of the composition of the glass fiber can raise the elastic modulus. On the other hand, the case where the content is 23.0% by weight or lower, since the liquid phase temperature decreases, can broaden the working temperature range. The $Al_2O_3$ content is preferably 19.5 to 22.0% by weight, and more preferably 20.0 to 21.0% by weight, based on the total weight of the composition of the glass fiber.

The case where the MgO content is 10.0% by weight or higher based on the total weight of the composition of the glass fiber can raise the elastic modulus of the glass fiber. On the other hand, the case where the content is 15.0% by weight or lower, since the liquid phase temperature decreases, can broaden the working temperature range. The MgO content is preferably 11.0 to 14.0% by weight, and more preferably 11.5 to 13.0% by weight, based on the total weight of the composition of the glass fiber.

If the CaO content is 4.0 to 11.0% by weight based on the total weight of the composition of the glass fiber, the production of the glass fiber is easy. That is, the case where the CaO content is 4.0% by weight or higher based on the total weight of the composition of the glass fiber, since the liquid phase temperature decreases, can broaden the working temperature range. On the other hand, the case where the content is 11.0% by weight or lower can reduce the 1,000-poise temperature and the liquid phase temperature. If the CaO content becomes 11.0% by weight or higher, since the liquid phase temperature of the glass composition becomes high in some cases, the CaO content is preferably 5.5 to 10.5% by weight, and more preferably 7.0 to 10.0% by weight, based on the total weight of the composition of the glass fiber.

In the case where the total content of $SiO_2$, $Al_2O_3$, MgO and CaO is lower than 99.5% by weight based on the total weight of the composition of the glass fiber, since the content of other impurity components becomes relatively high, the working temperature range in the production of the glass fiber and the elastic modulus of the glass fiber obtained cannot be secured. Therefore, the above total content is preferably 99.7% by weight or higher, and more preferably 99.8% by weight, based on the total weight of the composition of the glass fiber.

In the composition of the glass fiber, the total content (A+B) of the $SiO_2$ content (as A) and the $Al_2O_3$ content (as B) is preferably 77.0 to 85.0% by weight, and more preferably 78.0 to 82.0% by weight. If A+B is 85.0% by weight or lower, the melt temperature of the glass can be lowered sufficiently, and spinning is easily carried out. On the other hand, if A+B is 77.0% by weight or higher, since the devitrification phenomenon of deposition of crystals in the glass hardly occurs, spinning in the production of the glass fiber becomes easy. In order to make the 1,000-poise temperature 1,350° C. or lower, A+B is preferably 81.0% by weight or lower. Further in order to make the liquid phase temperature 1,300° C. or lower, A+B is preferably 80.0% by weight or lower.

In the composition of the glass fiber, the weight ratio of the $SiO_2$ content/the $Al_2O_3$ content (taken as A/B) is preferably 2.7 to 3.2, and more preferably 2.9 to 3.1. If A/B is 3.2 or lower, the glass fiber having a high elastic modulus can be obtained. On the other hand, if the weight ratio is 2.7 or higher, the liquid phase temperature can be reduced, and the devitrification phenomenon can be suppressed.

In the composition of the glass fiber, the total content (C+D) of the MgO content (as C) and the CaO content (as D) is preferably 16.0% by weight or higher. In the case where C+D is 16.0% by weight or higher, since the 1,000-poise temperature and the liquid phase temperature can be reduced, and additionally, the glass composition is easily melted and the viscosity can be reduced, the production of the glass fiber becomes easy. Therefore, (C+D) is more preferably 18.0% by weight or higher.

In the composition of the glass fiber, the weight ratio of the MgO content/the CaO content (taken as C/D) is preferably 0.8 to 2.0, and more preferably 1.0 to 1.8. If C/D is 2.0 or lower, since the liquid phase temperature decreases, the working temperature range can be broadened, and the working temperature range can be secured, for example, by 40° C. or higher. On the other hand, if C/D is 0.8 or higher, the elastic modulus of the glass fiber obtained can be raised.

As described above, according to findings now newly found by the present inventors, the speed of the devitrification of the glass containing $SiO_2$, $Al_2O_3$, MgO and CaO is influenced by the kind of the devitrification primary phase. That is, in the case where the devitrification primary phase is a cordierite crystal or a mixed crystal of cordierite and anorthite, crystals hardly deposit at the liquid phase temperature as compared with the case of other crystals. Therefore, in the case of spinning a molten glass of this composition, occurrence of trouble including cutting in the production of the glass fiber can be suppressed, allowing stable spinning.

From such a viewpoint, the glass fiber according to the present embodiment preferably has a composition in which the three components $SiO_2$, MgO and CaO in constituents of the glass fiber satisfy the condition being in the range surrounded by coordinate points described below in a three-component phase diagram represented by coordinates ((a), (b), (c)) in which (a) the $SiO_2$ content/(the $SiO_2$ content+the MgO content+the CaO content)×100, (b) the MgO content/(the $SiO_2$ content of+the MgO content+the CaO content)×100, and (c) the CaO content/(the $SiO_2$ content+the MgO content+the CaO content)×100 are taken as respective coordinates, the coordinate points being ((a)=81.0, (b)=19.0, (c)=0.0), ((a)=71.0, (b)=29.0, (c)=0.0), ((a)=71.0, (b)=15.0, (c)=14.0) and ((a)=81.0, (b)=8.0, (c)=11.0). In the case where the $Al_2O_3$ content is 19.0 to 23.0% by weight, particularly nearly 20% by weight, since in a glass composition for the glass fiber having such a composition, the devitrification primary phase forms a cordierite crystal or a mixed crystal of cordierite and anorthite, the glass composition is advantageous further for the production of the glass fiber.

In the case where $Al_2O_3$ is lower than 19.0% by weight, in the three-component phase diagram of $SiO_2$, MgO and CaO, the devitrification primary phase does not form a cordierite crystal or a mixed crystal of cordierite and anorthite in some cases. In order for the devitrification primary phase to form a cordierite crystal, the $Al_2O_3$ content based on the total weight is preferably 19.5% by weight or higher.

The glass fiber according to the present embodiment is more preferably made to have a composition in which the devitrification primary phase forms a cordierite crystal or a mixed crystal of cordierite and anorthite, provided that the contents of $SiO_2$, MgO, CaO and $Al_2O_3$ are made to be under the above-mentioned condition. Here, the composition in which the devitrification primary phase forms a cordierite crystal or a mixed crystal of cordierite and anorthite will be described hereinafter. FIG. 1 is a composition diagram showing compositions of the three components $SiO_2$, MgO and CaO of glass fibers. A point X in FIG. 1 is a point indicating ($SiO_2$, MgO, CaO)=(81.0% by weight, 19.0% by weight, 0.0% by weight); and a point Y is a point indicating ($SiO_2$, MgO, CaO)=(71.0% by weight, 29.0% by weight, 0.0% by weight). Further a point Z is a point indicating ($SiO_2$, MgO, CaO)=(71.0% by weight, 15.0% by weight, 14.0% by weight); and a point W is a point indicating ($SiO_2$, MgO, CaO)=(81.0% by weight, 8.0% by weight, 11.0% by weight). That is, the compositions in which the devitrification primary phase forms a cordierite crystal or a mixed crystal of cordierite and anorthite satisfy the condition being in the tetragonal range surrounded by the points X, Y, Z and W.

Here, % by weight of each component in the above points X, Y, Z and W indicates the content of the each component based on 100% by weight of the total of the three components $SiO_2$, MgO and CaO. However, since the composition of the glass fiber contains at least $Al_2O_3$ as a component other than $SiO_2$, MgO and CaO, the content of each component shown in FIG. 1 is different from an actual content.

Figure 2:
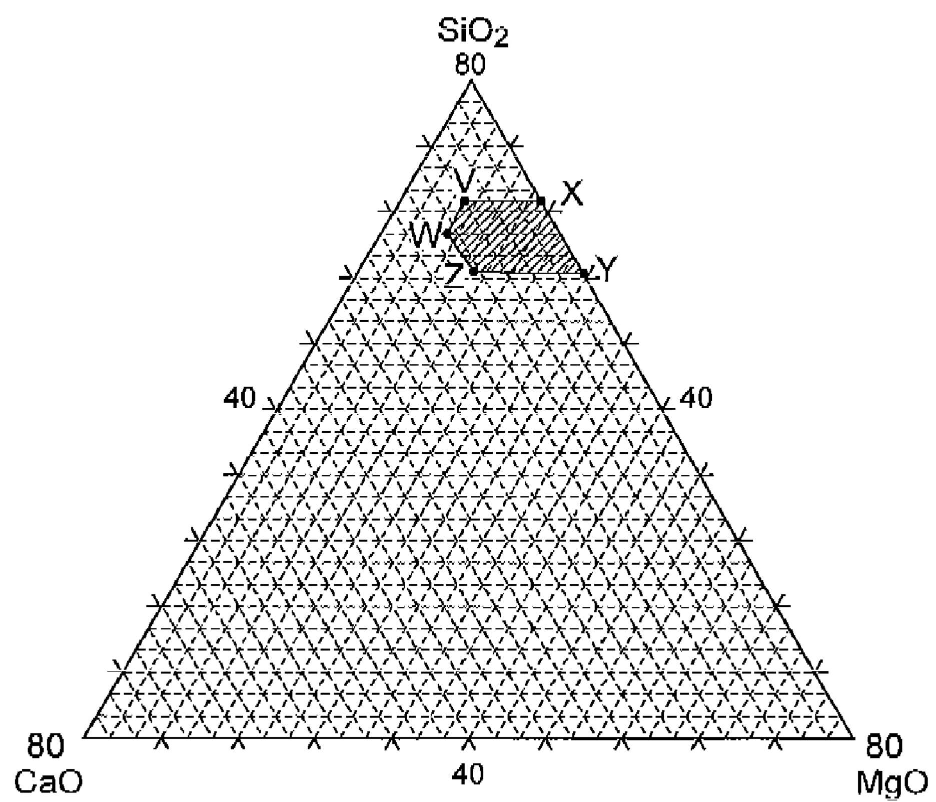
FIG. 2 is a composition diagram showing three-component compositions of $SiO_2$, MgO and CaO in the case where the $Al_2O_3$ content of the glass fibers is fixed at 20% by weight.

In a composition of the glass fiber, for example, in the case where the $Al_2O_3$ content is 20.0% by weight based on the total weight, contents of $SiO_2$, MgO and CaO in an actual composition of a glass fiber of each component at the points X, Y, Z and W become the numerical values described above multiplied by 0.8. FIG. 2 is a composition diagram showing compositions of the three components $SiO_2$, MgO and CaO in the case where $Al_2O_3$ is 20.0% by weight based on the total weight. Specifically, the composition of the glass fiber, based on the total weight of the composition of the glass fiber, satisfies the condition being in the range surrounded by the points X, Y, Z, W and V, in which the $Al_2O_3$ content is 20.0% by weight; the $SiO_2$ content is 56.8 to 64.8% by weight; the MgO content is 6.4 to 23.2% by weight; and the CaO content is 0.0 to 11.2% by weight. The region of the composition of the above three components in this composition diagram varies depending on the $Al_2O_3$ content.

The composition of the glass fiber according to the present embodiment basically contains $SiO_2$, MgO, CaO and $Al_2O_3$, and has the above-mentioned characteristic composition, but may further contain other components, for example, by inevitable mingling of substances contained in raw materials of each component. The other components include alkali metal oxides such as $Na_2O$, and $Fe_2O_3$, $Na_2O$, $TiO_2$, $ZrO_2$, $MoO_2$ and $Cr_2O_3$. These other components may be contained in lower than 0.5% by weight, preferably in lower than 0.3% by weight, and more preferably in lower than 0.2% by weight.

In the glass fiber according to the present embodiment, for fine regulation and the like of the glass composition to achieve particularly both the mechanical strength and the improvement of spinnability, $Fe_2O_3$ and an alkali metal oxide may be contained in 0.4% by weight or less in total, and preferably in 0.01% by weight or more and less than 0.3% by weight. In this case, the $Fe_2O_3$ content is preferably 0.01% by weight or more and less than 0.3% by weight, and more preferably 0.03% by weight or more and less than 0.2% by weight.

The above glass fiber can be produced from the glass composition. The glass fiber may take any form of a monofilament of the glass fiber, a glass fiber strand composed of a plurality of glass fiber monofilaments, and a glass fiber yarn obtained by twisting the glass fiber strand. The fiber diameter of the monofilament of the glass fiber may be, for example, 3 to 30 μm, and the glass fiber strand can be obtained by collecting, for example, 50 to 8,000 of the monofilaments. The glass fiber yarn can be produced by giving, for example, 13 or less-times twists/25-mm to the glass fiber strand. The glass fiber may be provided as a wound thread body in which about 10 to 200 km of the glass fiber is wound on the periphery of a paper- or plastic-made core material, or may be provided as glass fibers cut into about 1 inch (glass fiber chopped strand or the like). By using the glass fiber according to the present embodiment, the glass fiber may be provided as a woven fabric, knitted fabric, nonwoven fabric, mat, braid, roving, powder and the like of the glass fiber. The glass fiber according to the present embodiment may be used singly, but may be used in combination with one or more of a known commercially available glass fiber, carbon fiber, aramid fiber, ceramic fiber and the like.

As a method for producing the glass fiber, a known method such as the remelting method and the direct melting method can be employed. In these known methods, usually, a molten glass composition is drawn out from several hundreds to several thousands of platinum nozzles at a high speed to be fiberized to thereby obtain a glass fiber.

Meanwhile, the cross-sectional shape of the glass fiber according to the present embodiment may be not only a usual circular shape but also a flat cross-sectional fiber such as of an elliptical, oval or cocoon-shape type, or a profile cross-sectional fiber such as of a star-shape, hexagonal or triangular type. Particularly in the case where the glass fiber is a flat cross-sectional fiber or a profile cross-sectional fiber, spinning needs to be carried out in a relatively high viscosity. Therefore, if the composition is one in which the devitrification primary phase of the glass forms a cordierite crystal or a mixed crystal of cordierite and anorthite, crystals of the molten glass hardly deposit even in a high viscosity, that is, at a low temperature, allowing stable production of the glass fiber.

That is, in the case where the glass fiber is a flat cross-sectional fiber or a profile cross-sectional fiber, in order that the glass fiber is easily produced and has a sufficient elastic modulus, the following (1) and (2) conditions are preferably satisfied. Further in order to spin the glass fiber more stably, the following (3) condition is preferably satisfied.

(1) Based on the total weight of the composition of the glass fiber, the content of $SiO_2$ is 57.0 to 63.0% by weight; the content of $Al_2O_3$ is 19.0 to 23.0% by weight; the MgO content is 10.0 to 15.0% by weight; and the CaO content is 4.0 to 11.0% by weight.

(2) The total of the contents of $SiO_2$, $Al_2O_3$, MgO and CaO is 99.5% by weight or higher.

(3) The three components $SiO_2$, MgO and CaO have a composition satisfying the condition being in the range surrounded by coordinate points described below in a three-component phase diagram represented by coordinates ((a), (b), (c)) in which (a) the $SiO_2$ content/(the $SiO_2$ content+the MgO content+the CaO content)×100, (b) the MgO content/(the $SiO_2$ content+the MgO content+the CaO content)×100, and (c) the CaO content/(the $SiO_2$ content+the MgO content+the CaO content)×100 are taken as respective coordinates, the coordinate points being ((a)=81.0, (b)=19.0, (c)=0.0), ((a)=71.0, (b)=29.0, (c)=0.0), ((a)=71.0, (b)=15.0, (c)=14.0) and ((a)=81.0, (b)=8.0, (c)=11.0).

In a flat cross-sectional fiber and a profile cross-sectional fiber, the reduced fiber diameter is preferably 3 to 30 μm, and more preferably 5 to 20 μm. Particularly in a flat cross-sectional fiber, the flatness ratio is preferably 2 to 8, and more preferably 3 to 7. Here the reduced fiber diameter refers to a diameter of a circular cross-sectional fiber having the same fiber cross-sectional area, and the flatness ratio refers to a ratio (a long side/a short side) of the long side and the short side of a rectangle when the rectangle circumscribing the glass fiber cross-section and having a minimum area is assumed.

The glass fiber obtained by the above-mentioned method can be applied to various types of applications. The glass fiber can be applied, for example, to glass fibers for FRP and FRTP used in industrial materials and car parts materials, and glass fiber-reinforced materials of laminates for printed wiring boards being electronic materials.

Glass fiber composite materials can be produced by using reinforcing materials (matrix resins) with the glass fiber according to the present embodiment. A method for producing a glass fiber composite material depends on a matrix resin to be used. In the case of using a thermoplastic resin, a glass fiber composite material can be produced by a technique such as a stampable sheet molding method, an injection molding method and an infusion method. Examples of thermoplastic reins usable are polyethylene resins, polypropylene resins, polystyrene resins, acrylonitrile/butadiene/styrene (ABS) resins, methacrylic resins, vinyl chloride resins, polyamide resins, polyacetal resins, polyethylene terephthalate (PET) resins, polybutylene terephthalate (PBT) resins, polycarbonate resins, polyphenylene sulfide (PPS) resins, polyether ether ketone (PEEK) resins, liquid crystal polymer (LCP) resins, fluororesins, polyether imide (PEI) resins, polyarylate (PAR) resins, polysulfone (PSF) resins, polyether sulfone (PES) resins and polyamide-imide (PAI) resins.

On the other hand, in the case of using, as a matrix resin for a glass fiber composite material, a thermosetting resin such as an unsaturated polyester resin, a vinyl ester resin, an epoxy resin, a melamine resin or a phenol resin, a production method can be employed such as a hand lay-up method, a spray-up method, a resin transfer molding (RTM) method, a sheet molding compound (SMS) method, a bulk molding compound (BMC) method, a protrusion method, a filament winding method or an infusion method.

In glass fiber composite materials, as reinforcing materials other than matrix resins, usable are a cement, mortar, concrete, asphalt, metal, carbon, ceramic, natural rubber, synthetic rubber and the like.

Glass fiber composite materials using the glass fiber can be used as materials for various types of applications as described below. For example, in aircraft equipment applications, the glass fiber composite materials can be used for base materials for aircrafts, interior trimming materials, vibration-proof materials and the like, and in vehicle-related applications, they can be used for damping-reinforcing materials, bumpers, engine undercovers, fenders, roof materials, bodies, spoilers, muffler filters, dash panels, radiators, timing belts, and the like. In marine vessel-related applications, they can be used for motorboats, sailboats, fishing boats, and the like; in construction, engineering works and building-material-related applications, for faced walls, luminous ceilings and illumination covers, front face lining cloths, insect nets, roll blinds, film materials for tents, backlit signboards, corrugated panels, flat plates and folded plates for lighting, concrete-anticorrosive and -reinforcing materials, outer wall reinforcing materials, waterproof coating materials, smokeproof hanging walls, nonflammable transparent partitions, screen films, road reinforcing materials, bath tubs, bath and toilet units, and the like; and in leisure and sports-related applications, for fishing rods, tennis rackets, golf clubs, skiing boards, helmets, and the like. Further in electronic device-related applications, they are used for printed-circuit boards, electric insulating boards, terminal boards, substrates for ICs, electronic apparatus-housing materials, package materials for electronic components, optical apparatus-housing materials, package materials for optical components, insulating supporters, and the like; in industrial facility-related applications, for windmill blades, glass filter bags, outer shell materials of nonflammable heat-insulating materials, reinforcing materials of resinoid grindstones, aluminum-filtration filters, and the like; and in agriculture-related applications, for vinyl houses, poles for agriculture, silo tanks, and the like. The above-mentioned glass fiber composite materials can be used also as reinforcing materials of known fiber-reinforced composite materials.

EXAMPLES

Hereinafter, preferable Examples according to the present invention will be described in more detail, but the present invention is not limited to these Examples.

Preparation and Evaluation of Glass Compositions for the Glass Fiber

Glass raw materials were formulated so as to make compositions shown in Tables 1, 2 and 3, and glass compositions having the compositions containing $SiO_2$ (A), $Al_2O_3$ (B), MgO (C) and CaO (D) as basic compositions were melt spun to thereby obtain glass fibers having a fiber diameter of 13 μm. The obtained glass fibers had the same composition as the glass composition of the raw material. Then, for each glass fiber, the 1,000-poise temperature, the liquid phase temperature and the working temperature range in the production were determined; the devitrification resistance was evaluated and crystals of the devitrification primary phase were analyzed; and the elastic modulus of the glass fiber obtained finally was measured. The acquired results are shown in Tables 1, 2 and 3 together with the compositions. These characteristics were determined by the following evaluation methods.

(1) The 1,000-poise temperature: a glass of each glass composition melted in a platinum crucible was continuously measured for the viscosity while the melt temperature of the glass was being varied, by using a rotary B-type viscometer; and a temperature corresponding to one at which the viscosity was 1,000 poises was defined as a 1,000-poise temperature. The viscosity was measured according to JIS Z8803-1991.

(2) The liquid phase temperature: a crushed material of a glass of each glass composition was put in a platinum boat, and heated in a tubular electric oven provided with a temperature gradient of 1,000° C. to 1,500° C. A temperature at which crystals started to deposit was defined as a liquid phase temperature.

(3) The working temperature range: the working temperature range was calculated from (the 1,000-poise temperature)−(the liquid phase temperature).

(4) The elastic modulus: the elastic modulus was measured by an ultrasonic method. Ultrasonic waves (longitudinal wave sonic velocity, transverse wave sonic velocity) transmitting through a glass bulk were measured, and the elastic modulus was calculated from a specific gravity of the glass, and values of the longitudinal wave sonic velocity and the transverse wave sonic velocity.

(5) The evaluation of the devitrification resistance: each glass composition was melted at the 1,000-poise temperature or higher, and thereafter, allowed to stand at a temperature lower by 150° C.±50° C. than the liquid phase temperature for 6 hours. Then, the situation of crystals developing on the surface or the interior of the glass composition was observed, and evaluated in three stages. A indicates that no crystal deposited; B indicates that crystals deposited at a part of the surface; and C indicates that crystals deposited on the surface and the interior.

(6) The kinds of crystals of the devitrification primary phase: the sample measured for the liquid phase temperature was used, and the depositing crystal primary phase part was crushed and analyzed by an X-ray diffractometer to thereby identify the kinds of the crystals. The kinds of crystals of the devitrification primary phases in Tables 1 to 3 are according to the following description. In Tables, the case where two or more kinds of crystals are shown indicates that the coexistence of both crystal kinds was confirmed.

COR: Cordierite
ANO: Anorthite
PYR: Pyroxene
MUL: Mullite
TRI: Tridymite
SPI: Spinel
FOR: Forsterite
CRI: Cristobalite
CAS: Calcium Aluminium Silicate Samples 1 to 19 shown in Table 1 corresponded to respective Examples; and Samples 20 to 44 shown in Tables 2 and 3 corresponded to respective Comparative Examples. Further, Samples 36 to 39 in Table 3 corresponded to the glass compositions in examples 2 to 5 shown in Japanese Examined Patent Application Publication No. 62-001337. Samples 40 to 44 in Table 3 corresponded to the glass compositions in examples 1, 4, 7, 14 and 15 shown in Japanese Unexamined Patent Application Publication No. 2009-514773, respectively.

Further, molten glasses of the compositions in Examples 5 and 9 were spun to thereby obtain flat cross-sectional glass fibers having an oval cross-sectional shape having a reduced fiber diameter of 15 μm and a flatness ratio of 4. As a result, both the Samples were confirmed to exhibit excellent spinning workability.

TABLE 1

| Composition (wt %) | Sample | | | | | | | | | |
|---|---|---|---|---|---|---|---|---|---|---|
| Physical Properties | 1 | 2 | 3 | 4 | 5 | 6 | 7 | 8 | 9 | 10 |
| $SiO_2$(A) | 60.2 | 60.2 | 60.2 | 60.1 | 58.1 | 58.1 | 58.7 | 59.1 | 58.7 | 58.2 |
| $Al_2O_3$(B) | 21.1 | 20.1 | 20.1 | 20.1 | 20.1 | 20.1 | 20.1 | 20.1 | 20.6 | 21.1 |
| MgO(C) | 12.1 | 13.1 | 12.1 | 10.1 | 12.1 | 13.1 | 12.6 | 12.1 | 12.1 | 12.1 |
| CaO(D) | 6.6 | 6.5 | 7.5 | 9.5 | 9.5 | 8.5 | 8.5 | 8.5 | 8.5 | 8.5 |
| $Fe_2O_3$ | 0.0 | 0.0 | 0.0 | 0.1 | 0.1 | 0.1 | 0.1 | 0.1 | 0.1 | 0.1 |
| $Na_2O$ | 0.0 | 0.1 | 0.1 | 0.1 | 0.1 | 0.1 | 0.0 | 0.1 | 0.0 | 0.0 |
| Liquid Phase Temperature (° C.) | 1305 | 1286 | 1271 | 1238 | 1223 | 1241 | 1241 | 1254 | 1246 | 1268 |
| 1,000-poise Temperature (° C.) | 1346 | 1331 | 1338 | 1343 | 1302 | 1301 | 1311 | 1322 | 1318 | 1314 |
| Working Temperature Range (° C.) | 41 | 45 | 67 | 105 | 79 | 60 | 70 | 68 | 72 | 46 |
| Elastic Modulus (GPa) | 98 | 97 | 96 | 95 | 98 | 98 | 98 | 97 | 97 | 98 |
| Devitrification Resistance | A | A | A | A | B | A | A | A | A | A |
| Devitrification Primary Phase | COR | COR | COR | COR ANO | COR ANO | COR ANO | COR ANO | COR ANO | COR | COR |

TABLE 1-continued

| Composition (wt %) | Sample | | | | | | | | |
|---|---|---|---|---|---|---|---|---|---|
| Physical Properties | 11 | 12 | 13 | 14 | 15 | 16 | 17 | 18 | 19 |
| $SiO_2$(A) | 58.1 | 59.2 | 59.1 | 59.1 | 62.2 | 61.2 | 58.2 | 58.6 | 58.6 |
| $Al_2O_3$(B) | 20.6 | 20.1 | 21.1 | 20.1 | 21.1 | 21.1 | 20.6 | 20.6 | 20.6 |
| MgO(C) | 12.6 | 12.6 | 12.1 | 13.1 | 12.1 | 12.1 | 12.1 | 11.6 | 12.6 |
| CaO(D) | 8.5 | 8.0 | 7.5 | 7.5 | 4.6 | 5.6 | 9.0 | 9.0 | 8.0 |
| $Fe_2O_3$ | 0.1 | 0.0 | 0.1 | 0.1 | 0.0 | 0.0 | 0.1 | 0.1 | 0.1 |
| $Na_2O$ | 0.1 | 0.1 | 0.1 | 0.1 | 0.0 | 0.0 | 0.0 | 0.1 | 0.1 |
| Liquid Phase Temperature (° C.) | 1262 | 1262 | 1286 | 1262 | 1357 | 1325 | 1242 | 1249 | 1259 |
| 1,000-poise Temperature (° C.) | 1308 | 1319 | 1330 | 1317 | 1381 | 1359 | 1315 | 1321 | 1316 |
| Working Temperature Range (° C.) | 46 | 57 | 44 | 55 | 24 | 34 | 73 | 72 | 57 |
| Elastic Modulus (GPa) | 98 | 97 | 97 | 98 | 96 | 97 | 98 | 97 | 98 |
| Devitrification Resistance | A | A | A | A | A | A | A | A | A |
| Devitrification Primary Phase | COR | COR | COR | COR | COR | COR | COR ANO | COR ANO | COR ANO |

TABLE 2

| Composition (wt %) | Sample | | | | | | | | |
|---|---|---|---|---|---|---|---|---|---|
| Physical Properties | 20 | 21 | 22 | 23 | 24 | 25 | 26 | 27 | 28 |
| $SiO_2$(A) | 62.1 | 60.1 | 60.2 | 64.9 | 58.0 | 55.1 | 60.2 | 65.2 | 60.2 |
| $Al_2O_3$(B) | 18.1 | 18.1 | 18.1 | 24.9 | 24.0 | 15.1 | 15.1 | 15.1 | 15.1 |
| MgO(C) | 15.1 | 14.1 | 14.6 | 9.9 | 6.0 | 15.1 | 15.1 | 10.1 | 5.1 |
| CaO(D) | 4.5 | 7.5 | 7.0 | 0.0 | 12.0 | 14.5 | 9.5 | 9.6 | 19.6 |
| $Fe_2O_3$ | 0.1 | 0.1 | 0.1 | 0.3 | 0.0 | 0.1 | 0.0 | 0.0 | 0.0 |
| $Na_2O$ | 0.1 | 0.1 | 0.0 | 0.0 | 0.0 | 0.1 | 0.1 | 0.0 | 0.0 |
| Liquid Phase Temperature (° C.) | 1289 | 1268 | 1271 | 1465 | 1360 | 1261 | 1300 | 1316 | 1184 |
| 1,000-poise Temperature (° C.) | 1337 | 1310 | 1303 | 1470 | 1373 | 1200 | 1279 | 1386 | 1332 |
| Working Temperature Range (° C.) | 48 | 42 | 32 | 5 | 13 | −61 | −21 | 70 | 148 |
| Elastic Modulus (GPa) | 98 | 98 | 98 | 95 | 94 | 100 | 99 | 92 | 91 |
| Devitrification Resistance | C | C | C | C | C | C | C | A | A |
| Devitrification Primary Phase | COR PYR | PYR | PYR | MUL | ANO | ANO | PYR | CRI | CAS |

| Composition (wt %) | Sample | | | | | | |
|---|---|---|---|---|---|---|---|
| Physical Properties | 29 | 30 | 31 | 32 | 33 | 34 | 35 |
| $SiO_2$(A) | 55.1 | 50.1 | 40.2 | 60.1 | 55.1 | 50.2 | 60.1 |
| $Al_2O_3$(B) | 15.1 | 20.1 | 20.1 | 25.1 | 25.1 | 25.1 | 18.1 |
| MgO(C) | 20.1 | 20.1 | 20.1 | 10.1 | 5.1 | 15.1 | 15.1 |
| CaO(D) | 9.6 | 9.6 | 19.6 | 4.6 | 14.6 | 9.6 | 6.6 |
| $Fe_2O_3$ | 0.0 | 0.0 | 0.0 | 0.0 | 0.0 | 0.0 | 0.1 |
| $Na_2O$ | 0.1 | 0.1 | 0.0 | 0.1 | 0.1 | 0.0 | 0.0 |
| Liquid Phase Temperature (° C.) | 1378 | 1363 | >1400 | 1382 | >1400 | 1295 | 1294 |
| 1,000-poise Temperature (° C.) | 1175 | 1138 | 979 | 1392 | 1338 | 1207 | 1305 |
| Working Temperature Range (° C.) | −203 | −225 | — | 10 | — | −88 | 11 |

TABLE 2-continued

| | | | | | | | |
|---|---|---|---|---|---|---|---|
| Elastic Modulus (GPa) | 104 | 107 | 112 | 97 | 96 | 105 | 98 |
| Devitrification Resistance | C | C | C | A | C | C | C |
| Devitrification Primary Phase | FOR PYR | FOR | SPI FOR | COR | ANO | SPI | COR PYR |

TABLE 3

| Composition (wt %) | Sample | | | | | | | | |
|---|---|---|---|---|---|---|---|---|---|
| Physical Properties | 36 | 37 | 38 | 39 | 40 | 41 | 42 | 43 | 44 |
| $SiO_2$(A) | 48.0 | 54.0 | 67.0 | 55.0 | 62.6 | 63.0 | 62.3 | 65.0 | 64.0 |
| $Al_2O_3$(B) | 28.0 | 34.0 | 21.0 | 24.0 | 18.5 | 20.0 | 17.3 | 15.0 | 20.0 |
| MgO(C) | 16.0 | 4.0 | 4.0 | 5.0 | 9.5 | 11.3 | 8.0 | 6.0 | 11.0 |
| CaO(D) | 8.0 | 8.0 | 8.0 | 16.0 | 8.5 | 4.8 | 11.6 | 14.0 | 4.0 |
| $Fe_2O_3$ | 0.0 | 0.0 | 0.0 | 0.0 | 0.2 | 0.2 | 0.2 | 0.0 | 0.0 |
| $Na_2O$ | 0.0 | 0.0 | 0.0 | 0.0 | 0.7 | 0.7 | 0.7 | 0.0 | 1.0 |
| Liquid Phase Temperature (° C.) | 1390 | 1397 | 1313 | 1318 | 1238 | 1279 | 1261 | 1301 | 1316 |
| 1,000-poise Temperature (° C.) | 1196 | 1405 | 1501 | 1330 | 1366 | 1379 | 1348 | 1376 | 1398 |
| Working Temperature Range (° C.) | −194 | 8 | 188 | 12 | 128 | 100 | 87 | 75 | 82 |
| Elastic Modulus (GPa) | 107 | 98 | 89 | 96 | 93 | 95 | 92 | 90 | 94 |
| Devitrification Resistance | C | C | A | C | A | A | B | A | A |
| Devitrification Primary Phase | SPI COR | MUL | ANO CAS | ANO CAS | ANO CAS | COR | ANO CAS | ANO CAS | COR |

As shown in Tables 1 to 3, it is confirmed that Samples 1 to 19 being Examples exhibited broad working temperature ranges while exhibiting both low 1,000-poise temperatures and low liquid phase temperatures, and furthermore exhibited high elastic moduli, as compared with Samples 20 to 44 being Comparative Examples.

The invention claimed is:

1. A glass fiber, comprising:

a $SiO_2$ content of 57.0 to 60.2% by weight;

a $Al_2O_3$ content of 20.1 to 23.0% by weight;

a MgO content of 10.0 to 15.0% by weight; and a CaO content of 6.5 to 11.0% by weight, and a total content of $SiO_2$, $Al_2O_3$, MgO and CaO of 99.5% by weight or higher based on a total weight thereof, a weight ratio of the $SiO_2$ content/the $Al_2O_3$ content of 2.7 to 3.1, and a weight ratio of the MgO content/the CaO content of 1.0 to 2.0.

2. The glass fiber according to claim 1, comprising:

a total content of the $SiO_2$ content and the $Al_2O_3$ content of 78.0 to 82.0% by weight.

3. The glass fiber according to claim 1, comprising:

a total content of the MgO content and the CaO content of 18.0% by weight or higher.

4. The glass fiber according to claim 1, further comprising a $Fe_2O_3$ and/or an alkali metal oxide, wherein a total content of the $Fe_2O_3$ content and the alkali metal oxide content is from 0.01 to 0.4% by weight.

5. The glass fiber according to claim 1, further comprising a $Fe_2O_3$ and/or an alkali metal oxide, wherein a total content of the $Fe_2O_3$ content and the alkali metal oxide content is from 0.1 to 0.4% by weight, and a content of $Fe_2O_3$ is 0.1% by weight or more and less than 0.3% by weight.

6. The glass fiber according to claim 1, wherein the $SiO_2$ content is from 57.0 to 59.2% by weight.

7. The glass fiber according to claim 1, wherein the $SiO_2$ content is from 57.0 to 58.2% by weight.

8. The glass fiber according to claim 1, wherein the $Al_2O_3$ content is from 20.6 to 23.0% by weight.

9. The glass fiber according to claim 1, wherein the CaO content is from 8.5 to 9.5% by weight.

10. The glass fiber according to claim 1, wherein the $SiO_2$ content is from 57.0 to 58.2% by weight, and the CaO content is from 8.5 to 9.5% by weight.

11. The glass fiber according to claim 1, wherein a MgO content of 11.6 to 15.0% by weight; and a CaO content of 8.5 to 11.0% by weight.

* * * * *